United States Patent
Yamamoto

(10) Patent No.: US 6,960,843 B2
(45) Date of Patent: Nov. 1, 2005

(54) PARALLEL OPERATING SYSTEM FOR UNINTERRUPTIBLE POWER UNITS

(75) Inventor: Yuushin Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 94 days.

(21) Appl. No.: 10/750,759

(22) Filed: Jan. 5, 2004

(65) Prior Publication Data
US 2004/0240244 A1 Dec. 2, 2004

(30) Foreign Application Priority Data
May 27, 2003 (JP) .................................. 2003-149559

(51) Int. Cl.⁷ .................................................. H02J 1/00
(52) U.S. Cl. ............................ 307/86; 307/65; 307/80
(58) Field of Search .............................. 307/64, 65, 66, 307/67, 69, 80, 81, 82, 86; 363/50, 55, 131

(56) References Cited

U.S. PATENT DOCUMENTS

| | | | | |
|---|---|---|---|---|
| 5,633,789 A | * | 5/1997 | Kimura et al. | 307/86 |
| 5,646,459 A | * | 7/1997 | Hatate et al. | 307/86 |
| 5,811,960 A | * | 9/1998 | Van Sickle et al. | 307/67 |
| 6,304,006 B1 | * | 10/2001 | Jungreis | 307/64 |

FOREIGN PATENT DOCUMENTS

JP 2002-010527 11/2002

* cited by examiner

*Primary Examiner*—Jessica Han
(74) *Attorney, Agent, or Firm*—Leydig, Voit & Mayer, Ltd.

(57) ABSTRACT

A system for operating in parallel plural non-break power units, each unit including an inverter inserted between an input power source and a parallel bus and an AC switch inserted between the bypass power source and the parallel bus and having an inverter power supply mode via the inverter and a bypass source power supply mode via the AC switch when the inverter stops. Each unit includes a switch driver for generating an AC switch driving signal in response to an inverter power supply signal based on the output signal of a sequence control circuit. Inverter mode signal output terminals are mutually connected. The switch driver generates the relevant AC switch driving signal on the basis of an inverter supply signal synthesized on a per-unit basis.

9 Claims, 12 Drawing Sheets

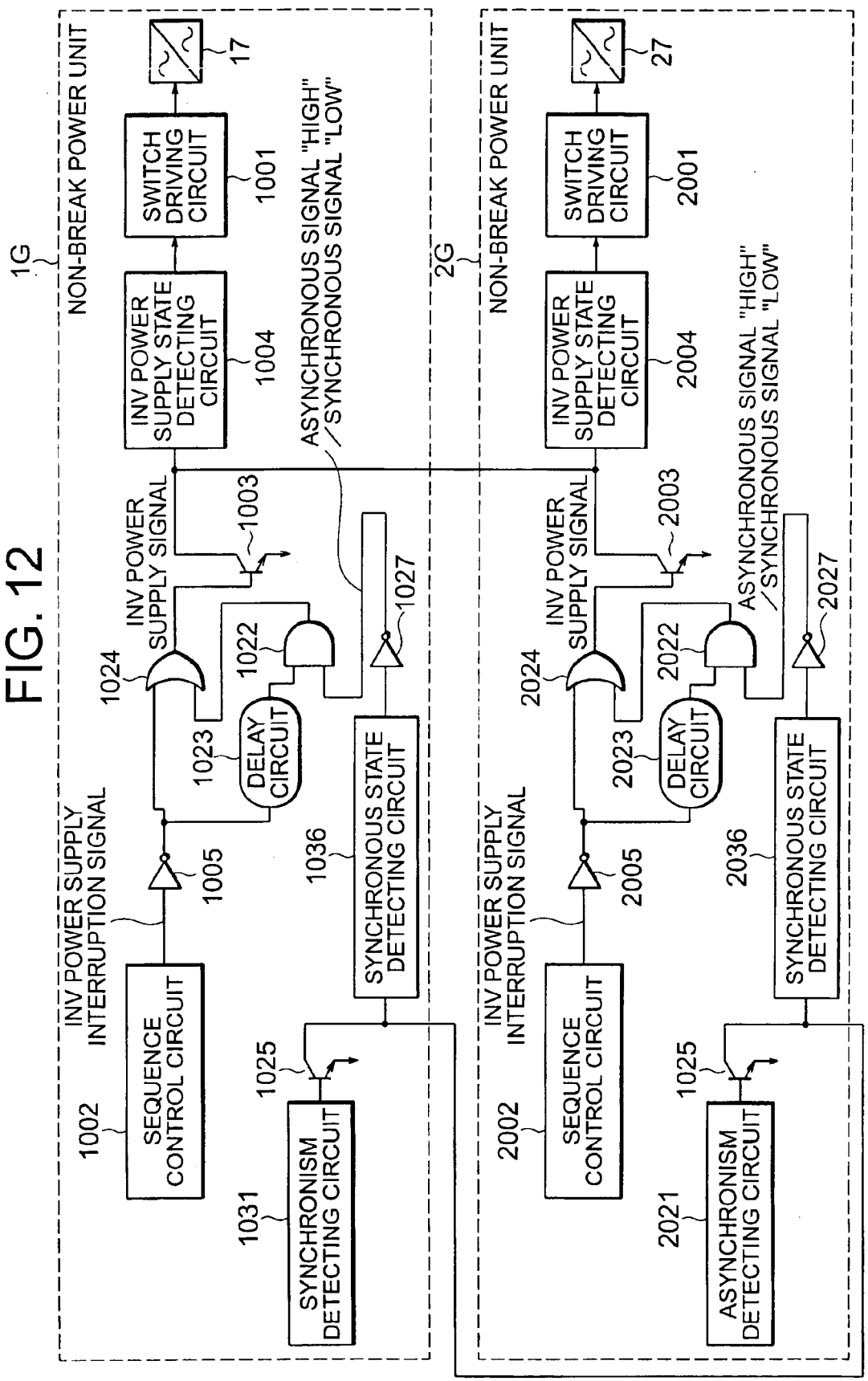

PARALLEL OPERATING SYSTEM FOR UNINTERRUPTIBLE POWER UNITS

BACKGROUND OF THE INVENTION

1. Field of the Invention

The present invention generally relates to a system for operating in parallel a plurality of non-break power units (also known as the uninterruptible power equipment or uninterruptible power supply) which are inserted separately between a bypass power source and a plurality of input power sources on one hand and a parallel bus on the other hand. This system will also be referred to as the non-break power unit parallel operating system for the convenience of description. More particularly, the present invention is concerned with the non-break power unit parallel operating system in which the number of inter-unit wiring conductors for interconnecting the individual non-break power units as well as complexity of wiring can significantly be reduced.

2. Description of Related Art

The conventional non-break power unit parallel operating system known heretofore includes a plurality of non-break power units inserted separately or independently from one another between a bypass power source and a plurality of input power sources on one hand and a parallel bus on the other hand, wherein a switchgear (molded case circuit breaker or MCCB for short) is inserted on the output side of each of the non-break power units.

Each of the non-break power units is comprised of a converter for converting an AC power fed from an input power source to a DC power, an inverter (INV) for converting the DC power to an AC power, and an AC switch (alternating current switch) connected to the bypass power source. The non-break power unit has two operation modes, i.e., an inverter or INV power supply mode in which the AC switch is opened for supplying the electric power to the parallel bus from the associated input power source by way of the inverter, and a bypass power supply mode in which the AC switch is closed upon stoppage of the inverter to thereby allow the AC power to be supplied straightforwardly to the parallel bus from the bypass power source by way of the AC switch. (For more particulars; reference may have to be made to Japanese Patent Application Laid-Open Publication No. 10527/2002 (JP-A-H14-10527).)

The AC switch incorporated in the non-break power unit has to be turned on or closed in the single unit operation mode in which the non-break power unit to which the AC switch mentioned above belongs is operating, when the operation of the associated inverter stops (when the inverter power supply to the load from the input power source is interrupted or stopped). However, in the parallel redundant operation mode in which a plurality of non-break power units are operating, the AC switch mentioned above must be maintained in the opened or off state when the inverter power supply is performed by the other non-break power unit(s) regardless of stoppage of the inverter power supply through the concerned non-break power unit to which the above-mentioned AC switch belongs.

Consequently, in the conventional parallel operating system disclosed in the Japanese Patent Application Laid-Open Publication No. 10527/2002 (JP-A-H14-10527), the operation described above is realized by wiring e.g. two non-break power units by a pair of signal lines for mutually transferring the inverter power supply state signals between the two non-break power units.

As is apparent from the above, in the conventional non-break power unit parallel operating system, the inverter power supply state signals are mutually transferred between the non-break power units. Accordingly, when the two non-break power units are operated in parallel, there are required two signal lines between the individual non-break power units. Further, in the case where three non-break power units are operated in parallel, six signal lines are required among the non-break power units. In general, when n non-break power units are operated in parallel, there are demanded n(n−1) signal lines, giving rise to a problem that the inter-unit wiring (i.e., wiring of the signal lines between or among the non-break power units) becomes complicate.

SUMMARY OF THE INVENTION

In the light of the state of the art described above, it is an object of the present invention to provide a non-break power unit parallel operating system in which the number of the inter-unit wiring conductors as well as complexity of wiring can significantly be reduced.

In view of the above and other objects which will become apparent as the description proceeds, there is provided according to a general aspect of the present invention a system for operating in parallel a plurality of non-break power units inserted separately between a bypass power source and a plurality of input power sources on one hand and a parallel bus on the other hand.

Each of the non-break power units includes an inverter inserted between the input power source and the parallel bus and an AC switch inserted between the bypass power source and the parallel bus.

The non-break power unit has two operation modes, i.e., an inverter power supply mode in which power supply is performed from the input power source to the parallel bus by way of the inverter with the AC switch being opened, and a bypass power supply mode in which when operation of the inverter stops, the AC switch is closed to thereby enable the AC power to be supplied straightforwardly to the parallel bus from the bypass power source by way of the AC switch.

Each of the non-break power units further includes a sequence control circuit for generating an output signal corresponding to an inverter power supply signal, a switching element for outputting the inverter power supply signal on the basis of an output signal of the sequence control circuit, and a switch driving circuit for generating a driving signal for the AC switch in response to the inverter power supply signal.

Output terminals of the switching elements incorporated in a plurality of non-break power units, respectively, are connected to one another.

The switch driving circuit incorporated in each of the non-break power units is so designed as to generate the driving signal to the associated AC switch on the basis of a composite signal generated by synthesizing the inverter power supply signals in the individual non-break power units.

With the arrangement of the non-break power unit parallel operating system described above, there can be realized the non-break power unit parallel operating system in which the number of the inter-unit wiring conductors as well as the complexity of wiring can significantly be reduced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 12 is a functional block diagram showing a circuit arrangement of the non-break power units according to an eighth embodiment of the present invention.

DESCRIPTION OF THE PREFERRED EMBODIMENTS

Figure 1:
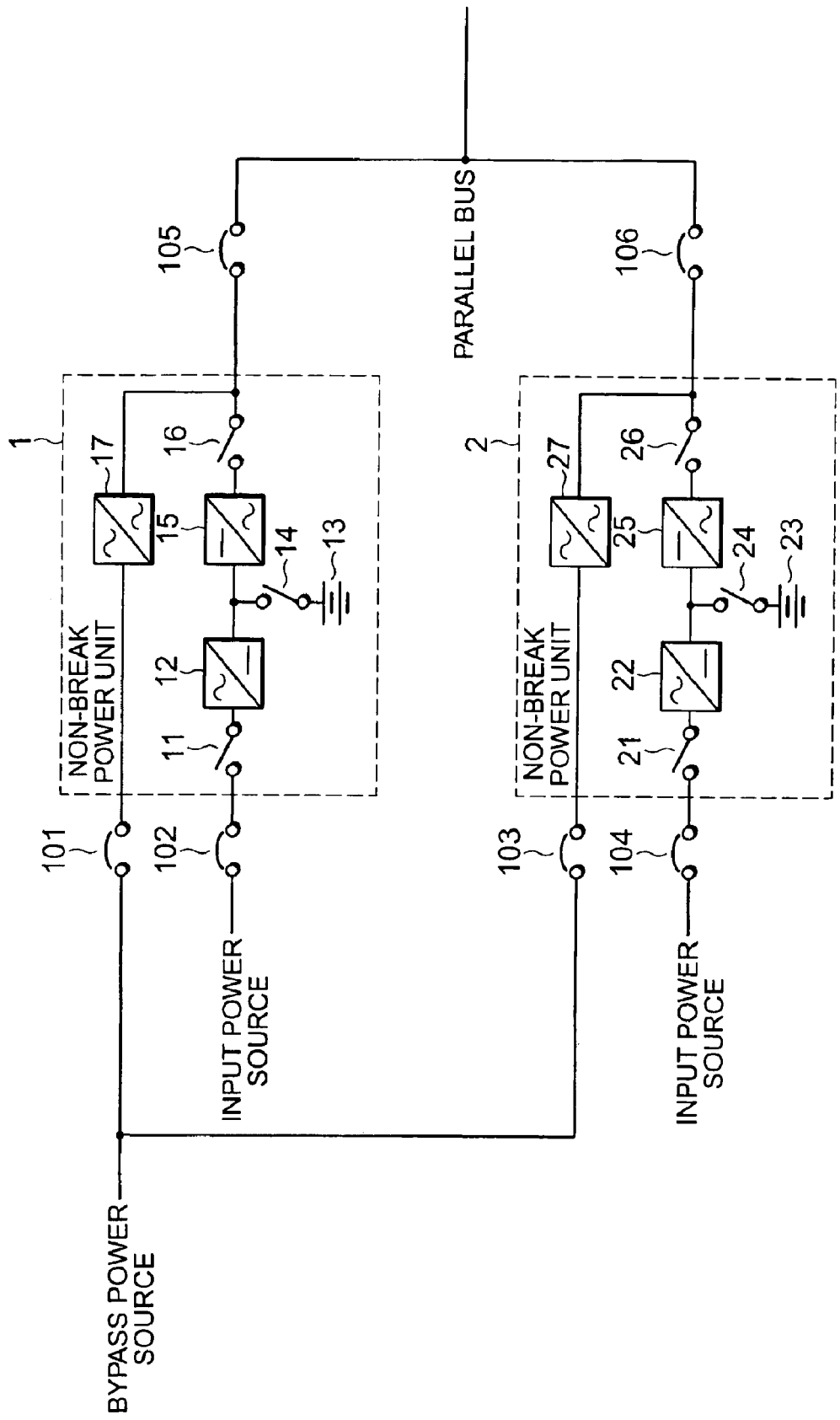
FIG. 1 is a circuit diagram which shows generally and schematically a configuration of a non-break power unit parallel operating system according to a first embodiment of the present invention.

The present invention will be described in detail in conjunction with what is presently considered as preferred or typical embodiments thereof by reference to the drawings. In the description which follows, like reference characters designate like or corresponding parts throughout the several views.

Embodiment 1

Now, referring to the drawings, the non-break power unit parallel operating system according to the first embodiment of the present invention will be described.

FIG. 1 is a circuit diagram which shows generally and schematically a configuration of a non-break power unit parallel operating system (i.e., system for operating in parallel a plurality of non-break power units) to which the teaching of the present invention incarnated in a first embodiment thereof is applied on the presumption, by way of example, that a pair of non-break power units 1 and 2 are employed, being connected in parallel.

Figure 2:
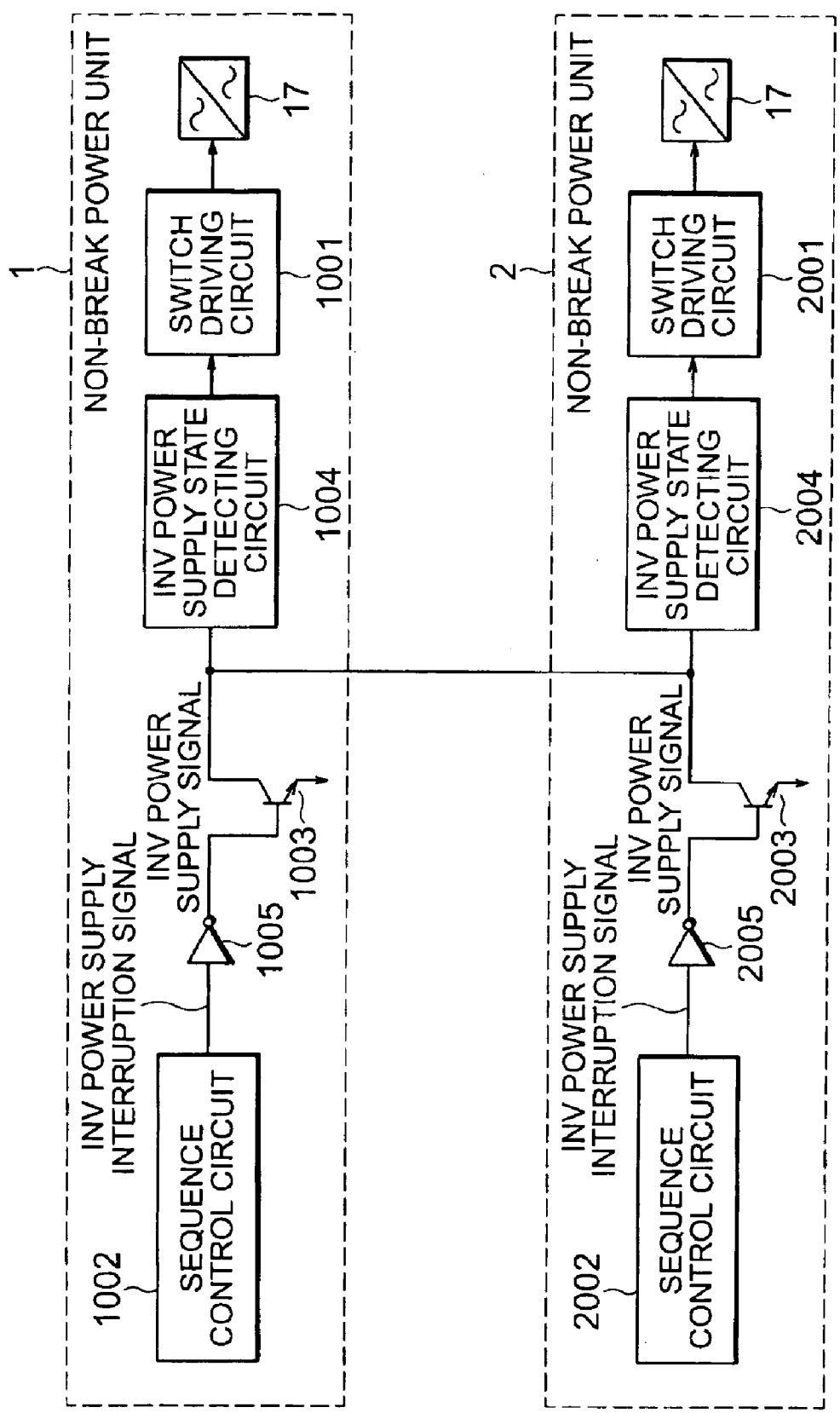
FIG. 2 is a functional block diagram showing a circuit arrangement of non-break power units according to the first embodiment of the invention.
Figure 3:
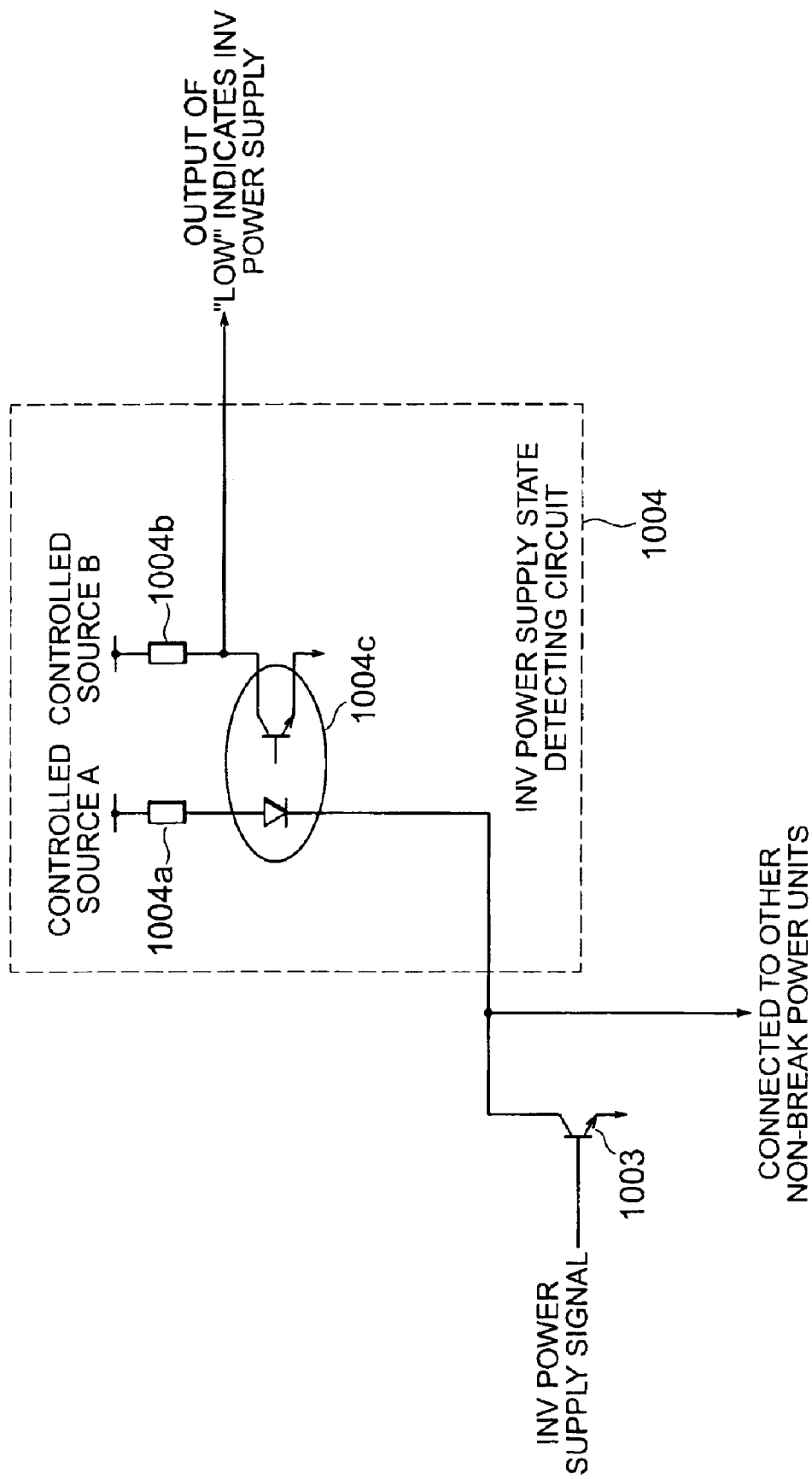
FIG. 3 is a circuit diagram showing concretely a typical circuit arrangement of an inverter power supply state detecting circuit incorporated in the non-break power unit according to the first embodiment of the invention.

Further, FIG. 2 is a functional block diagram showing concretely a circuit arrangement in each of the non-break power units shown in FIG. 1, and FIG. 3 is a circuit diagram showing concretely a typical circuit arrangement of an inverter power supply state detecting circuit incorporated in the non-break power unit shown in FIG. 2.

Referring to FIG. 1, input terminals of the non-break power units 1 and 2 disposed in parallel with each other are connected to a bypass power source by way of molded case circuit breakers (MCCB) 101 and 103, respectively, and at the same time connected independently or separately to input power sources (AC power sources) through molded case circuit breakers (MCCB) 102 and 104, respectively. On the other hand, output terminals of the non-break power units 1 and 2 are connected to a common terminal of a parallel bus by way of molded case circuit breakers (MCCB) 105 and 106, respectively.

The non-break power unit 1 is comprised of a switchgear 11 connected to the molded case circuit breaker 102, a converter 12 for AC/DC conversion connected to the switchgear 11, a battery 13 connected to the output terminal of the converter 12 through a switch 14, an inverter (also referred to as INV for short) 15 for DC-to-AC conversion connected to the output terminal of the converter 12, a switchgear 16 connected to the output terminal of the inverter 15, and an AC (alternating current) switch 17 inserted between the molded case circuit breakers 101 and 105.

Similarly, the non-break power unit 2 is comprised of a switchgear 21 connected to the molded case circuit breaker (MCCB) 104, a converter 22 connected to the switchgear 21, a battery 23 connected to the output terminal of the converter 22 via a switchgear 24, an inverter 25 connected to the output terminal of the converter 22, a switchgear 26 connected to the output terminal of the inverter 25, and an AC switch 27 inserted between the molded case circuit breakers 103 and 106.

Referring to FIG. 1 and paying attention to the non-break power unit 1, the AC switch 17 incorporated in the non-break power unit 1 has to be closed or turned on when the inverter power supply (power supply through the inverter) to the load is interrupted due to stoppage of operation of the inverter 15 (or when the switchgear 16 is opened or turned off) in a single unit operation mode, as described hereinbefore. However, in the parallel redundant operation mode, the AC switch 17 must be maintained in the opened or off state when the inverter power supply is validated by way of the other non-break power unit 2 even if the inverter power supply of the non-break power unit 1 to which the AC switch 17 belongs is stopped or interrupted.

FIG. 2 shows a circuit arrangement for driving or turning on the AC switch 17 or 27 to thereby effectuate the bypass power supply.

Referring to FIG. 2, the non-break power unit 1 is comprised of a switch driving circuit 1001 designed to generate a driving signal for the AC switch 17, a sequence control circuit 1002 designed to generate an inverter power supply signal (or inverter power supply interruption signal), a switching element (transistor, relay or the like) 1003 for converting the inverter power supply signal to a driving signal, an inverter power supply state detecting circuit 1004 designed for detecting the power supply state of the inverter 15 (see FIG. 1), and an inverting circuit 1005 for inverting the inverter power supply interruption signal outputted from the sequence control circuit 1002 to the inverter power supply signal.

Similarly, the non-break power unit 2 is comprised of a switch driving circuit 2001 designed to generate a driving signal for the AC switch 27, a sequence control circuit 2002 designed to generate an inverter power supply signal (or inverter power supply interruption signal), a switching element 2003 for converting the inverter power supply signal to a driving signal, an inverter power supply state detecting circuit 2004 designed for detecting the power supply state of the inverter 25, and an inverting circuit 2005 for inverting the inverter power supply interruption signal to the inverter power supply signal.

In the non-break power units 1 and 2, the input sides of the switch driving circuits 1001 and 2001 are connected to each other through the inverter power supply state detecting circuits 1004 and 2004, respectively, to thereby synthesize the inverter power supply signals in the non-break power units 1 and 2, respectively, to a composite signal so that the driving signal for the alternating current (AC) switch can be generated on the basis of the composite signal.

Although the case where the two non-break power units 1 and 2 are operated in parallel is shown in FIGS. 1 and 2, it should be understood that three or more non-break power units can be operated in parallel in a similar manner. In other words, even when stoppage of the inverter power supply takes place in one of the non-break power units, the AC switch in that one non-break power unit must be maintained in the off state so far as the inverter power supply of the other non-break power unit(s) employed for the parallel operation is alive.

FIG. 3 is a circuit diagram showing concretely a circuit configuration of the inverter power supply state detecting circuit 1004 shown in FIG. 2 on the presumption, by way of example, that parallel operation of plural (three or more) non-break power units is carried out.

Referring to FIG. 3, the inverter power supply state detecting circuit 1004 is comprised of resistors 1004a and 1004b which are connected independently to controlled sources A and B, respectively, and a photo-coupler 1004c constituted by a light transmitting element and a light receiving element, the photo-coupler 1004c being connected to the resistors 1004a and 1004b.

Incidentally, the controlled sources A and B may be constituted by separate power sources as shown in the figure or alternately by one and the same power source.

More specifically, a light emitting diode (light transmitting element) constituting a part of the photo-coupler 1004c is connected to one resistor 1004a while a photo-transistor serving as the light receiving element which constitutes the other part of the photo-coupler 1004c is connected to the other resistor 1004b.

The light emitting diode has an output terminal (cathode) connected to the collector of the switching element 1003 and the other non-break power units.

On the other hand, the collector of the photo-transistor constitutes the output terminal for the inverter power supply state signal for outputting the inverter power supply state signal of level "LOW" indicating the power supply state of the inverter 15 when the photo-transistor is on (i.e., when the photo-transistor is in the conducting state).

Next, referring to FIGS. 1 to 3, operation of the non-break power unit parallel operating system according to the instant embodiment of the present invention will be described.

Referring to FIG. 3, the inverter power supply state detecting circuit 1004 outputs the inverter power supply state signal of level "LOW" when either one of the associated non-break power unit 1 (i.e., the non-break power unit in which the inverter power supply state detecting circuit 1004 is incorporated) or the other non-break power unit connected in parallel with the non-break power unit 1 is in the inverter power supply mode.

On the other hand, when the operation of the inverters of all the non-break power units inclusive of the associated non-break power unit 1 stops, necessitating the bypass power supply, the phototransistor of the photo-coupler 1004c is turned off. As a consequence, the inverter power supply state signal of level "HIGH" is outputted from the inverter power supply state detecting circuit 1004. Then, the AC switch 17 is driven by the inverter power supply state signal of level "HIGH" through the medium of the switch driving circuit 1001.

More specifically, since the collectors of the individual switching elements 1003 and 2003 are connected in common, as can be seen in FIG. 2, the inverter power supply interruption signal is outputted from the sequence control circuit 1002 or 2002 when at least one of the inverters 15 and 25 (see FIG. 1) operates, as a result of which the switching element 1003 or 2003 is turned on (i.e., becomes conductive) by way of the inverting circuit 1005 or 2005.

At that time point, the electric potential at the circuit point at which the output terminal (collector) of the switching element 1003 is connected to the other non-break power unit assumes level "LOW". Consequently, a current flows through the light emitting diode incorporated in the photo-coupler 1004c from the controlled source A through the resistor 1004a.

Thus, the photo-transistor of the photo-coupler 1004c assumes on-state (conducting state), as a result of which the inverter power supply state signal of level "LOW" is outputted from the inverter power supply state detecting circuit 1004.

On the other hand, in the case where neither the inverter 15 nor the inverter 25 of the plural non-break power units 1 and 2 is operating, no current flows through the light emitting diode incorporated in the photo-coupler 1004c of the inverter power supply state detecting circuit 1004. Thus, the photo-transistor assumes the off-state. Consequently, the inverter power supply state signal of level "HIGH" of the electric potential from the controlled source B pulled up by the resistor 1004b is outputted from the inverter power supply state detecting circuit 1004.

In this case, the signal transferred between the non-break power units 1 and 2 is only the inverter power supply signal. In other words, the two non-break power units 1 and 2 can be operated in parallel with only one signal.

As is apparent from the above, by connecting in parallel the output terminals for the inverter power supply signals of the plural non-break power units 1 and 2 and by generating the driving signal for the AC switch 17; 27, a plurality of non-break power units 1 and 2 can be operated in parallel while reducing the number of conductors for wiring the plural non-break power units.

Needless to say, in the case where three or more non-break power units are connected in parallel, similar action and effect can be ensured.

Embodiment 2

In conjunction with the first embodiment of the invention, the non-break power unit parallel operating system in which a pair of non-break power units 1 and 2 are operated in parallel has been described. A second embodiment of the present invention is directed to the non-break power unit parallel operating system in which three non-break power units are operated in parallel, as shown in FIG. 4 or 5.

In the following, the parallel operating system for operating three non-break power units will be described by reference to FIGS. 4 and 5 together with FIG. 1.

Figure 4:
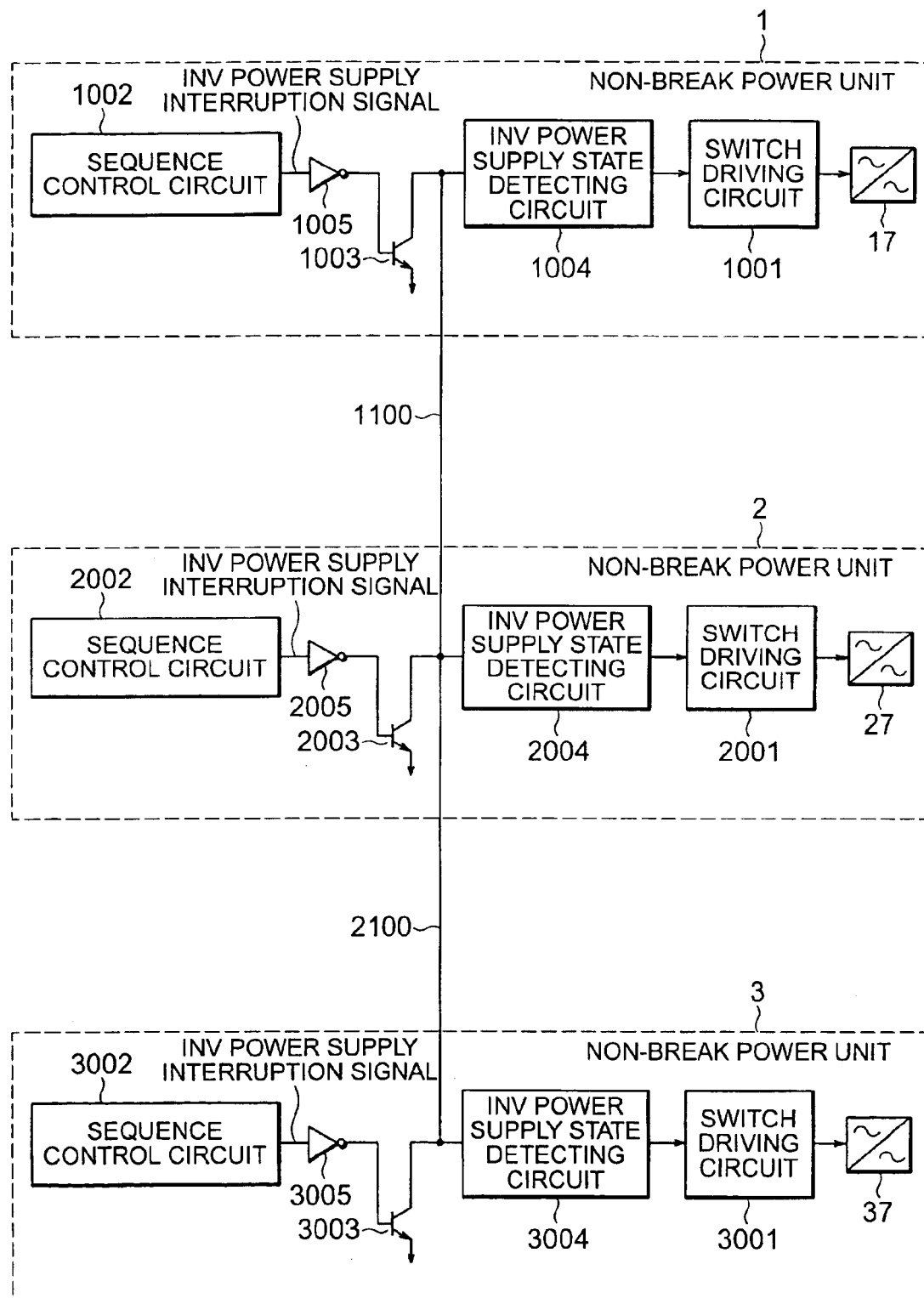
FIG. 4 is a block diagram showing an exemplary circuit arrangement of the non-break power units according to a second embodiment of the present invention.
Figure 5:
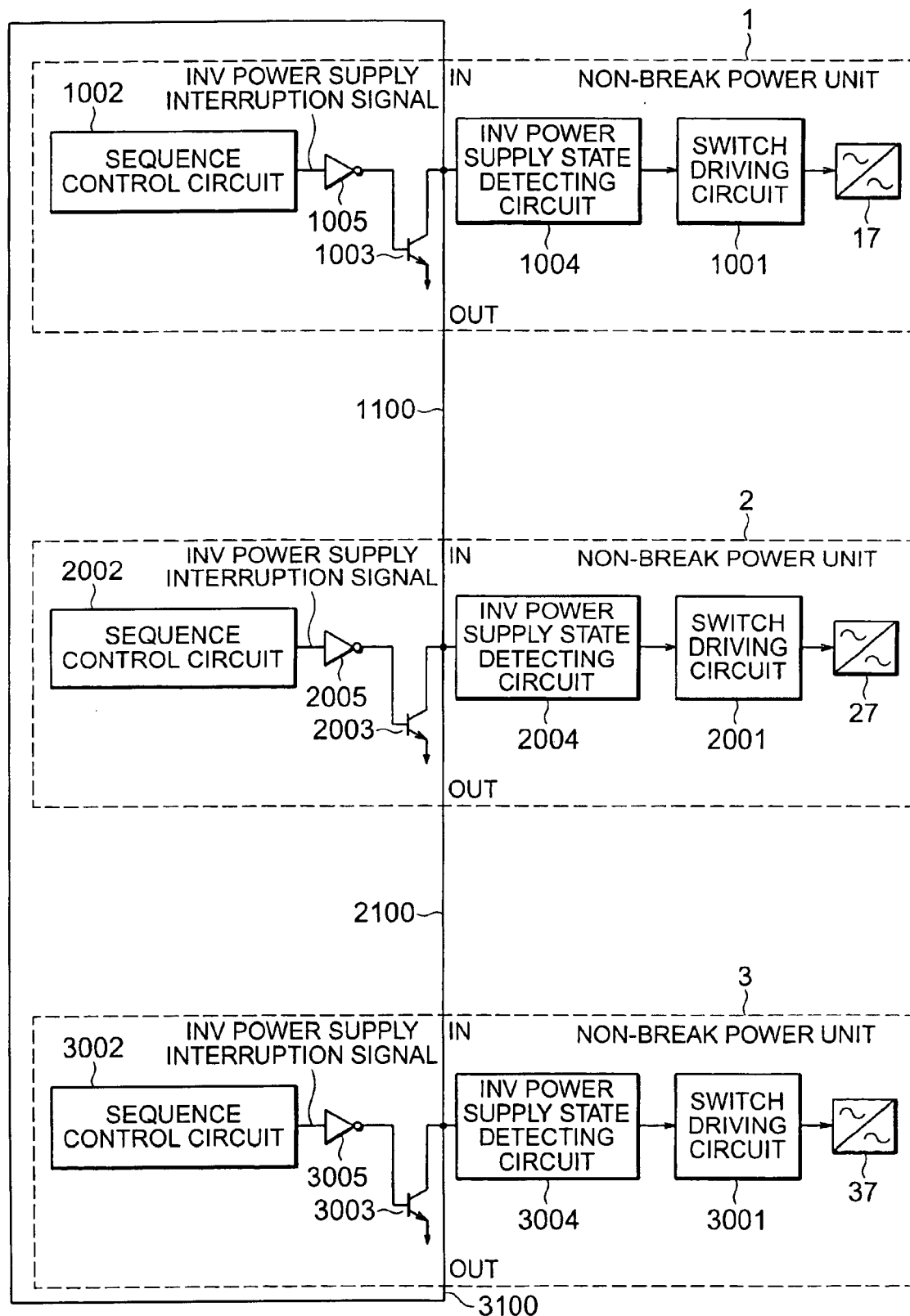
FIG. 5 is a block diagram showing another example of circuit arrangement of the non-break power units according to the second embodiment of the invention.

FIG. 4 is a circuit block diagram showing the non-break power unit parallel operating system according to the second embodiment of the invention. In this figure, the circuitries or components same as or equivalent to those described hereinbefore (see FIG. 2) are designated by like reference symbols and detailed description thereof will be omitted. Further, it should be added that the structure of the parallel operating system and the individual non-break power units are similar to those shown in FIG. 1 on the whole.

In the non-break power unit parallel operating system according to the instant embodiment of the invention, the two non-break power units 1 and 2 described previously are connected to each other by an inter-unit wiring conductor 1100 and additionally a third non-break power unit 3 is connected to the non-break power unit 2 by an inter-unit wiring conductor 2100.

The non-break power unit 3 is composed of an AC (alternating current) switch 37, a switch driving circuit 3001, a sequence control circuit 3002, a switching element 3003, an inverter (INV) power supply state detecting circuit 3004 and an inverting circuit 3005 similarly to the non-break power units 1 and 2.

As can be seen in FIG. 4, in order to operate in parallel the three interconnected non-break power units (NBPUs) 1, 2 and 3, there are required at least two inter-unit wiring conductors 1100 and 2100.

By providing these inter-unit wiring conductors 1100 and 2100, the inverter power supply state detecting circuits 1004, 2004 and 3004 are capable of recognizing that any one of the non-break power units 1 to 3 is in the inverter power supply state when any one of the switching elements 1003, 2003 and 3003 incorporated in the non-break power units is put into operation.

On the other hand, in the non-break power unit parallel operating system shown in FIG. 5, there is provided an inter-unit wiring conductor 1100 which interconnects the non-break power unit 1 and the non-break power unit 2, an inter-unit wiring conductor 2100 which interconnects the non-break power unit 2 and the non-break power unit 3 and an inter-unit wiring conductor 3100 which interconnects the non-break power unit 3 and the non-break power unit 1.

Further, each of the switching elements 1003, 2003 and 3003 incorporated in the non-break power units 1, 2 and 3, respectively, is provided with two output terminals "IN" and "OUT" in correspondence to the adjacent non-break power units on both sides, respectively.

As is apparent from the above, by connecting the inverter power supply signal output terminals of the individual non-break power units 1 to 3 in parallel, as shown in FIG. 5, for thereby generating the driving signals for the AC switches 17, 27 and 37, respectively, and by connecting the inter-unit wiring conductors 1100, 2100 and 3100 in a loop-like form (annular form), it is possible to operate in parallel the individual non-break power units 1 to 3 by employing a small number of inter-unit wiring conductors. Besides, the reliability of the non-break power unit parallel operating system can be enhanced. Additionally, the inter-unit wiring can be carried out in conformance to simple rules, whereby the wiring work as involved can be facilitated.

More specifically, for the parallel connection of n non-break power units, the number of the inter-unit wiring conductors as required is n, which means that the number of the inter-unit wiring conductors can significantly be reduced when compared with the conventional non-break power unit parallel operating system known heretofore. In addition, by providing the two terminals "IN" and "OUT" for each of the non-break power units 1 to 3, the wiring work can be carried out in accordance with a simple rule that "the terminal "IN" of a non-break power unit is connected to the terminal "OUT" of other one of the non-break power units.

Furthermore, by connecting in parallel the non-break power units 1 to 3 in the loop-like form, such a fault that any one of the inter-unit wiring conductors 1100, 2100 and 3100 is broken can be disposed of by the two other inter-unit wiring conductors, whereby the parallel connection state of the output terminals of the switching elements 1003, 2003 and 3003 of the three non-break power units can be sustained to allow the parallel operation to continue.

Embodiment 3

In the non-break power unit parallel operating system according to the first embodiment of the invention described previously, the driving signal for the AC switches 17 and 27 is generated on the basis of only the inverter or INV power supply interruption signal in the non-break power units 1 and 2, respectively. A third embodiment of the present invention is concerned with the non-break power unit parallel operating system in which auxiliary contacts 1008 and 2008 are provided in association with the molded case circuit breakers or MCCB 105 and 106 (see FIG. 1), wherein the state signals of the molded case circuit breakers (MCCBs) 105 and 106 are additionally taken into account as the condition for generating the driving signals for the AC switches 17 and 27, respectively.

In the following, the non-break power unit parallel operating system according to the third embodiment of the present invention will be described by referring to FIG. 6 together with FIG. 1.

Figure 6:
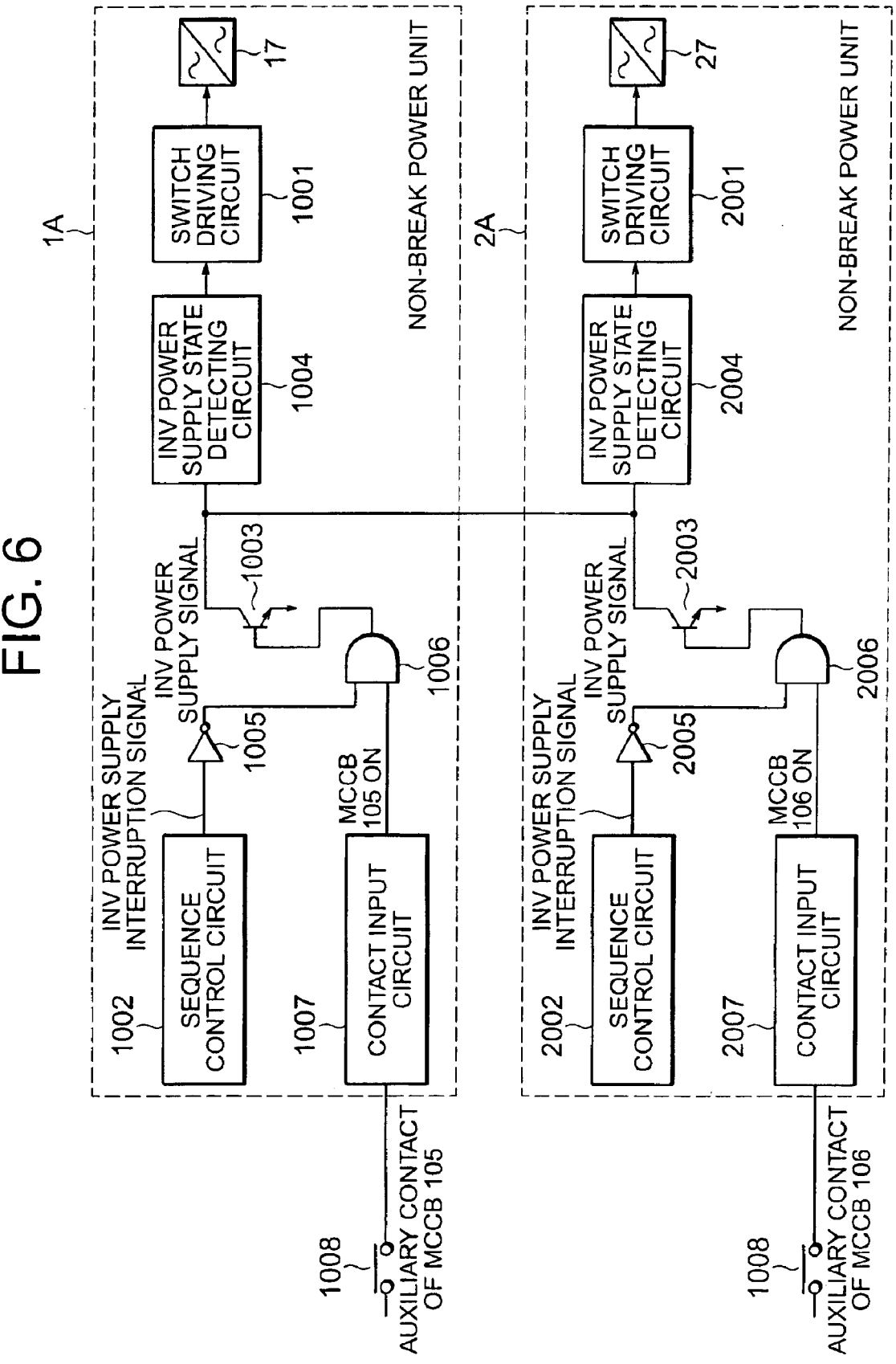
FIG. 6 is a functional block diagram showing a circuit arrangement of the non-break power units according to a third embodiment of the present invention.

FIG. 6 is a circuit block diagram showing partially a circuit arrangement of the non-break power unit parallel operating system according to the third embodiment of the present invention. In this figure, components similar to those described previously (see FIG. 2) are denoted by like reference symbols affixed with or without "A", and detailed description thereof will be omitted.

Referring to FIG. 6, the non-break power unit parallel operating system is provided with an auxiliary contact 1008 of the molded case circuit breaker (MCCB) 105 and an auxiliary contact 2008 of the molded case circuit breaker (MCCB) 106 as the elements added to the non-break power unit parallel operating system shown in FIG. 2.

The auxiliary contacts 1008 and 2008 are so arranged as to perform on/off operation in response to the on/off operation of the molded case circuit breakers (MCCBs) 105 and 106 to thereby generate the state signals of the MCCBs 105 and 106, respectively, which signals are then inputted to the non-break power units 1A and 2A, respectively.

The auxiliary contacts 1008 and 2008 are disposed on the input sides of the switch driving circuits 1001 and 2001, respectively, with reference to the inverter power supply signals.

The non-break power unit 1A includes an AND circuit 1006 inserted between the output terminal of the inverting circuit 1005 and the base terminal of the switching element 1003 and a contact input circuit 1007 inserted between the auxiliary contact 1008 and one input terminal of the AND circuit 1006. The other input terminal of the AND circuit 1006 is connected to the output terminal of the inverting circuit 1005.

Similarly, the non-break power unit 2A includes an AND circuit 2006 inserted between the output terminal of the inverting circuit 2005 and the base terminal of the switching element 2003 and a contact input circuit 2007 inserted between the auxiliary contact 2008 and one input terminal of the AND circuit 2006.

By additionally taking into account the state signals from the auxiliary contacts 1008 and 2008, respectively, as the condition for generating the driving signals for the AC switches 17 and 27, respectively, the output terminals for the inverter power supply signals in the non-break power units 1A and 2A mutually are coupled in parallel to the output terminals for the inverter power supply signals of the counterpart non-break power units, respectively, and the state signal of the molded case circuit breaker or MCCB 105 or 106 is additionally taken into consideration in each non-break power unit itself.

By virtue of the arrangement described above, it is possible to generate properly without fail the driving signal for the AC switch incorporated in one non-break power unit for which no inspection is conducted (i.e., non-break power unit which is supplying power to the load) when the other non-break power unit 1A or 2A operated in parallel is undergoing the inspection.

By way of example, referring to FIG. 1, it is assumed that the molded case circuit breaker or MCCB 105 is in the closed or on state with the non-break power unit 1 operating, while the molded case circuit breaker 106 is in the opened or off state because the non-break power unit 2 is inspected.

In that case, when the sequence control circuit 2002 incorporated in the non-break power unit 2 is being inspected with the switching element 2003 being on (closed), the AC switch 17 can not be closed with the structure of the non-break power unit parallel operating system according to the first embodiment (see FIG. 2) Consequently, even in the case where operation of the inverter 15 incorporated in the non-break power unit 1 is stopped due to a fault or for other cause, it is impossible to make transition to the bypass power supply operation mode.

For coping with the problem mentioned above, the non-break power unit parallel operating system according to the third embodiment of the invention is so arranged that the switching element 1003 can be turned on (closed) only when the molded case circuit breaker (MCCB) 105 provided on the output side of the non-break power unit 1A itself.

For implementing the above-mentioned arrangement in the circuit configuration shown in FIG. 6 by taking the non-break power unit (NBPU) 1A as example, the state signal from the auxiliary contact 1008 of the molded case circuit breaker 105 incorporated in the concerned non-break power unit 1A is inputted to the contact input circuit 1007, whereon AND logic of the output signal of the contact input circuit 1007 (on-signal of the molded case circuit breaker 105) and the output signal of the inverting circuit 1005 (inverter power supply signal) is determined by the AND circuit 1006. The switching element 1003 is then driven on the basis of the logical product signal (AND signal).

By virtue of the structure of the non-break power unit parallel operating system according to the third embodiment of the invention, not only the non-break power units 1A and 2A can be operated in parallel with a reduced number of inter-unit wiring conductors but also the driving signal for the AC switch of the other non-break power unit which is not being inspected can be generated correctly or properly when inspection is being performed for the concerned non-break power unit.

Embodiment 4

In the non-break power unit parallel operating system according to the third embodiment of the invention described above, the AC switches 17 and 27 are driven on the basis of the output signals of the inverter power supply state detecting circuits 1004 and 2004, respectively, which are incorporated in the non-break power units 1A and 2A, respectively. The non-break power unit parallel operating system according to a fourth embodiment of the present invention is so arranged that when the molded case circuit breaker or MCCB 105; 106 disposed on the output sides of the respective non-break power unit is off, then the AC switch of the concerned non-break power unit can be driven in response to the inverter power supply interruption signal of the concerned non-break power unit regardless of the signal state in the other non-break power unit(s).

In the following, the non-break power unit parallel operating system according to the fourth embodiment of the present invention will be described by referring to FIG. 7 together with FIG. 1.

In this figure, components similar to those described previously (see FIG. 6) are denoted by like reference symbols affixed with or without "B", and detailed description thereof will be omitted.

Figure 7:
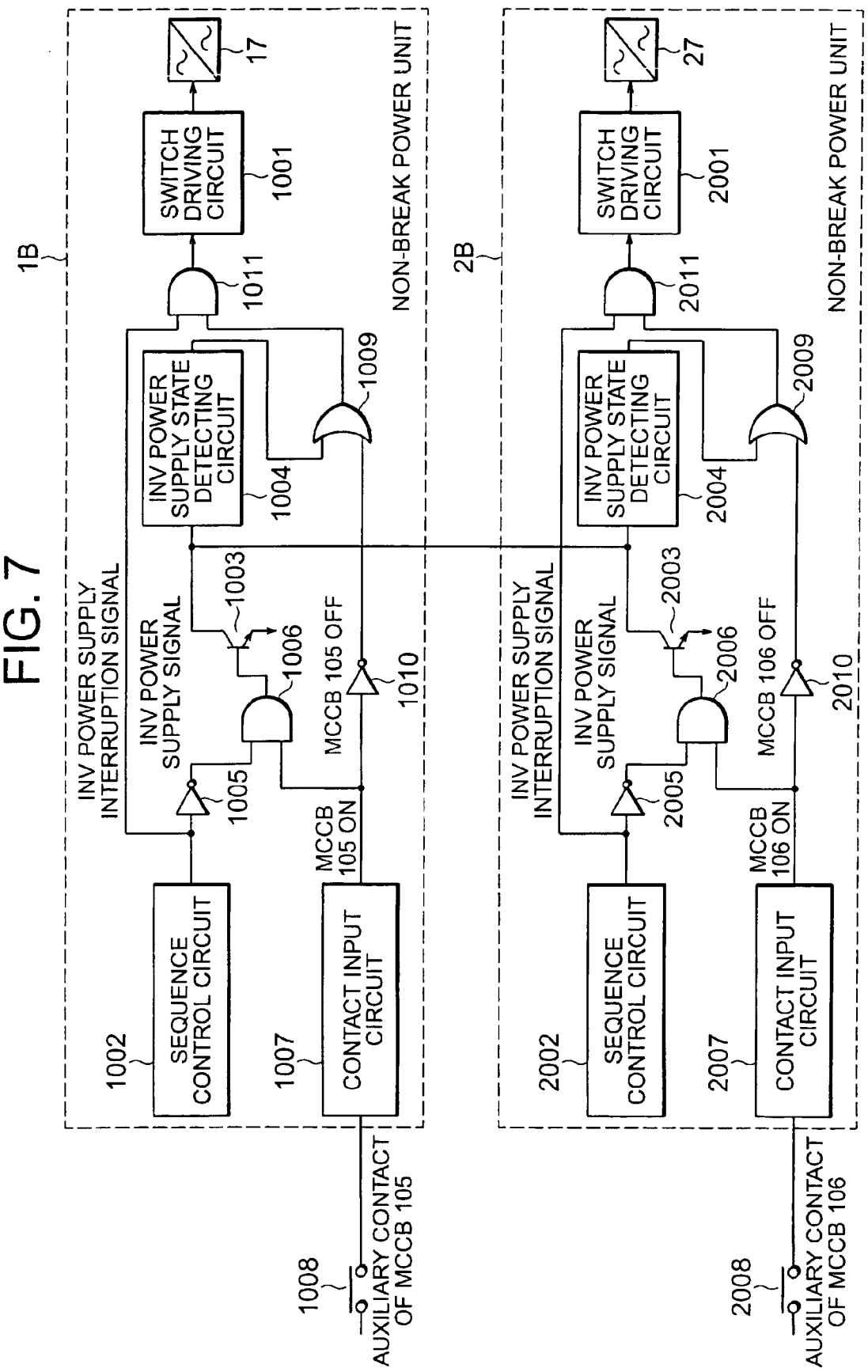
FIG. 7 is a functional block diagram showing a circuit arrangement of the non-break power units according to a fourth embodiment of the present invention.

Referring to FIG. 7, the non-break power units 1B and 2B are provided with OR circuits 1009 and 2009, inverting circuits 1010 and 2010, and AND circuits 1011 and 2011, respectively, as the elements added to the non-break power unit parallel operating system shown in FIG. 6.

The inverting circuits 1010 and 2010 are designed to invert the output signals of the contact input circuits 1007 and 2007, respectively.

The OR circuit 1009 determines a logical sum between the inverted output of the contact input circuit 1007 and the output signal of the inverter power supply state detecting circuit 1004 while the OR circuit 2009 determines a logical sum between the inverted output of the contact input circuit 2007 and the output signal of the inverter power supply state detecting circuit 2004.

The AND circuit 1011 determines a logical product of the output signal of the sequence control circuit 1002 and the output signal of the OR circuit 1009 while the AND circuit 2011 determines a logical product of the output signal of the sequence control circuit 2002 and the output signal of the OR circuit 2009. The output of the AND circuit 1011 is inputted to the switch driving circuit 1001 while that of the AND circuit 2011 is inputted to the switch driving circuit 2001.

Referring to FIG. 7, the non-break power unit parallel operating system according to the instant embodiment of the invention differs from that described previously by reference to FIG. 6 in the respect that when the molded case circuit breaker (MCCB) 105; 106 disposed on the output side of the non-break power unit 1B; 2B is off, then the AC switch 17; 27 can be driven by the inverter power supply interruption signal of the concerned non-break power unit parallel operating system regardless of the signal state in the other non-break power unit.

In this case, when any one of the non-break power units 1B and 2B operated inparallel is being inspected, the driving signal for the AC switch can properly be outputted from the one non-break power unit being inspected regardless of the signal state in the other non-break power unit which is supplying power to the load.

By way of example, let's suppose that the non-break power unit 2 shown in FIG. 1 is operating (with the molded case circuit breaker (MCCB) 106 being closed or on) and that the non-break power unit 1 is being inspected (with the molded case circuit breaker 105 being opened).

In that case, when it is confirmed for test that the AC switch 17 is closed upon stoppage of the inverter 15 in the non-break power unit 1, the AC switch 17 remains off (i.e., not becomes conductive) so long as the non-break power unit 2 is in the inverter power supply mode, making thus it impossible to perform the inspection work.

For coping with the problem mentioned just above, in the non-break power unit parallel operating system according to the fourth embodiment of the invention, such arrangement is adopted that when the molded case circuit breaker of the concerned non-break power unit is off, then the AC switch thereof can be driven in response to only the inverter power supply interruption signal of the concerned non-break power unit independently of the operation mode of the other non-break power unit.

In the circuit configuration shown in FIG. 7, the above-mentioned arrangement is realized as follows. Considering the non-break power unit 1B as example, the state signal from the auxiliary contact 1008 of the molded case circuit breaker 105 incorporated in the non-break power unit 1B is inputted to the contact input circuit 1007.

Then, the output signal of the contact input circuit 1007 (signal "ON" of the molded case circuit breaker 105) is inverted to the signal "OFF" by the inverting circuit 1010 to be subsequently inputted to the OR circuit 1009.

Further, the output signal of the switching element 1003 (composite signal of the individual non-break power units) is inputted to the OR circuit 1009 through the inverter power supply state detecting circuit 1004 to be logically ORed with the signal "OFF" inputted from the molded case circuit breaker 105. The logical sum signal outputted from the OR circuit 1009 is then inputted-to one of the input terminals of the AND circuit 1011.

Inputted to the other terminal of the AND circuit 1011 is the output signal of the sequence control circuit 1002 (inverter power supply interruption signal of the concerned non-break power unit). Thus, the inverter power supply interruption signal and the output signal of the OR circuit 1009 are logically ANDed by the AND circuit 1011. Thus, the output signal of level "HIGH" is outputted from the AND circuit 1011 to be inputted to the switch driving circuit 1001 only when the molded case circuit breaker 105 of the concerned non-break power unit is off or opened regardless of the operation mode of the other non-break power unit.

Thus, it is possible to drive the AC switch 17 in response to only the inverter power supply interruption signal of the concerned non-break power unit.

Further, not only the non-break power units 1 and 2 can be operated in parallel with a small number of inter-unit wiring conductors but also the driving signal can properly be generated for the AC switch of the non-break power unit which is not being inspected (which is supplying power to the load) when the concerned non-break power unit is being inspected.

In addition, upon inspection of one of the non-break power units 1 and 2 operated in parallel, the AC switch of the non-break power unit which is being inspected can be driven independently of the operation state of the other non-break power unit which is supplying power to the load, whereby the inspection can be much facilitated.

Embodiment 5

A fifth embodiment of the present invention is concerned with the inverter power supply state detecting circuit which is so implemented as to operate effectively even when a short-circuit fault should take place not only in the controlled sources A and B incorporated in the inverter power supply state detecting circuit of the concerned non-break power unit but also in the controlled sources incorporated in the inverter power supply state detecting circuit of the other non-break power unit which is operating in parallel with the concerned non-break power unit.

In the following, referring to FIG. 8, description will be made of the inverter power supply state detecting circuit of the non-break power unit parallel operating system according to the fifth embodiment of the present invention which circuit is so arranged as to be able to operate effectively even upon occurrence of a short-circuit fault in the controlled source of the other non-break power unit operating in parallel with the concerned non-break power unit.

Figure 8:
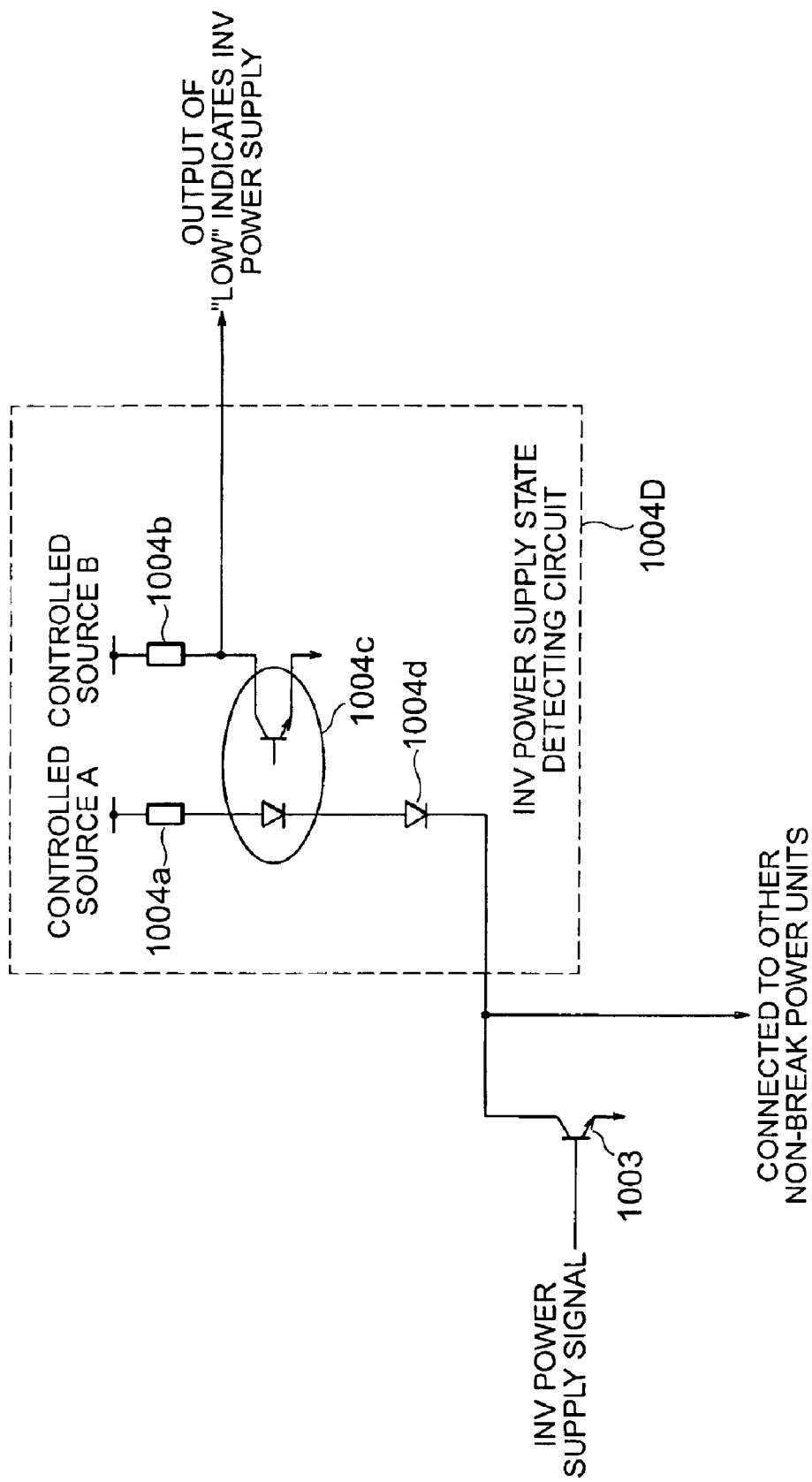
FIG. 8 is a circuit diagram showing concretely a typical circuit arrangement of an inverter power supply state detecting circuit incorporated in the non-break power unit according to a fifth embodiment of the present invention.

In FIG. 8, components similar to those described previously (see FIG. 3) are denoted by like reference symbols affixed with or without "D", and detailed description thereof will be omitted.

The inverter power supply state detecting circuit shown in FIG. 8 differs from the one shown in FIG. 3 only in the respect that a diode 1004d is inserted between the photo-coupler 1004c and the collector of the switching element 1003.

The diode 1004d is capable of withstanding a voltage which is not lower than that of the controlled source A and connected forwardly to the light emitting diode of the photo-coupler 1004c.

Next, referring to FIG. 8 in combination with FIG. 1, description will be directed to the operation of the inverter power supply state detecting circuit of the non-break power unit parallel operating system according to the fifth embodiment of the invention.

As described hereinbefore, the inverter power supply state detecting circuit 1004D is so designed as to generate the output signal of level "LOW" (indicating the inverter power supply state) so long as any one of the non-break power units connected in parallel, inclusive of the associated or concerned non-break power unit 1 to which the inverter power supply state detecting circuit 1004D belongs, is in the inverter power supply mode, while the inverter power supply state detecting circuit 1004D generates the output signal of level "HIGH" when there arises the necessity for the bypass power supply upon stoppage of the operation of the inverters of all the non-break power units operating in parallel.

Since the collector (output terminal) of the switching element 1003 is connected in parallel to that or those of the other non-break power unit or units, the output signal of the switching element 1003 corresponding equivalently to the potential prevailing at the location where the switching elements are connected between the non-break power units assumes the level "LOW" so long as the inverter of even one of the non-break power units operating in parallel is operating.

Consequently, a current flows through the light emitting diode incorporated in the photo-coupler 1004c from the controlled source A via the resistor 1004a and the diode 1004d, and thus the photo-transistor incorporated in the photo-coupler 1004c assumes on-state (conducting state), whereby the output signal of level "LOW" is generated by the inverter power supply state detecting circuit 1004D.

On the other hand, when none of the inverters is operating in the non-break power units operating in parallel, no current flows through the light emitting diode of the photo-coupler 1004c. Consequently, the photo-transistor assumes off-state, and thus the output-signal of potential level "HIGH" pulled up by the controlled source B via the resistor 1004b is outputted from the inverter power supply state detecting circuit 1004D.

At this juncture, it is assumed, by way of example, that the reverse voltage of the light emitting diode incorporated in the photo-coupler 1004c is of an ordinary level or value (a few voltages), the controlled source A is rated higher than 15 volts inclusive and that the diode 1004d is not inserted.

On the assumption mentioned above, when a short-circuit fault takes place in the controlled source A of the inverter power supply state detecting circuit 1004D, the electric potential at the location where the output terminals of the switching elements 1003 are interconnected between or among the non-break power units becomes "LOW" regardless of the inverter power supply state, as a result of which the AC switch driving signal may erroneously be generated.

For evading the inconvenience or problem mentioned above, the diode 1004d capable of withstanding the voltage higher than that of the controlled source A inclusive is inserted in series to the resistor 1004a according to the teachings o the present invention.

As is apparent from the above, by connecting in parallel the output terminals of the inverter power supply signals of the individual non-break power units for thereby generating the AC switch driving signal, not only the parallel operation of the non-break power units can be realized with fewer inter-unit wiring conductors but also erroneous generation of the AC switch driving signal can be prevented even when a short-circuit fault should occur the controlled source in the other non-break power unit.

Embodiment 6

In the non-break power unit parallel operating system according to the first embodiment of the invention, the driving signals for the AC switches 17 and 27 are generated on the basis of only the inverter power supply interruption signal in the non-break power units 1 and 2, respectively. A sixth embodiment of the present invention is concerned with the non-break power unit parallel operating system in which an asynchronous state between the output voltage of the inverter 15; 25 and that of the bypass power source is additionally taken into account as the condition for generating the driving signal for the AC switch 17; 27.

In the following, referring to FIGS. 9 and 10 in combination with FIG. 1, description will be made of the non-break power unit parallel operating system according to the sixth embodiment of the invention in which the asynchronous state between the output voltage of the inverter and that of the bypass power source is added as one of the conditions for generating the signal for driving the AC switch 17; 27.

Figure 9:
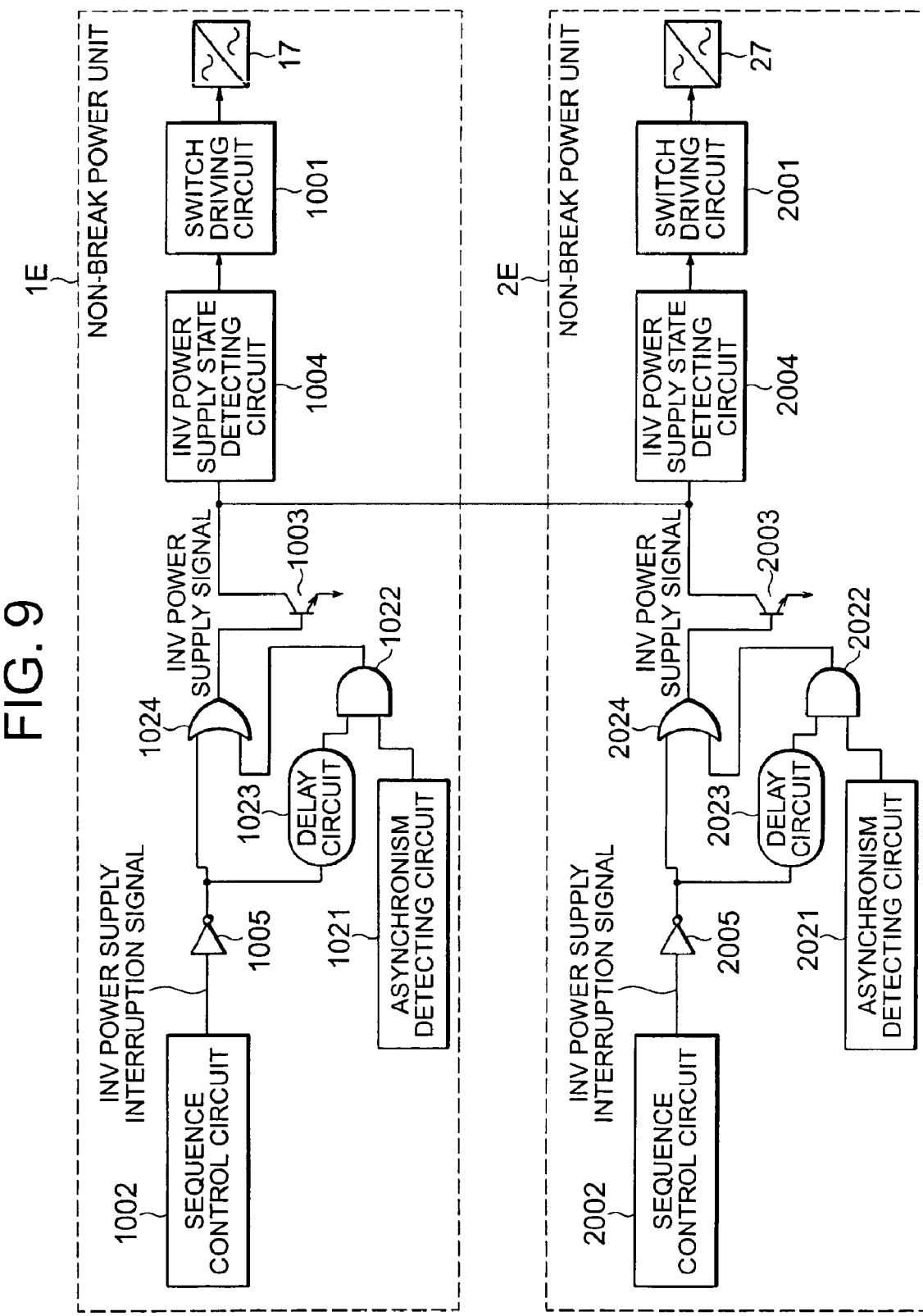
FIG. 9 is a functional block diagram showing a circuit arrangement of the non-break power units according to a sixth embodiment of the present invention.
Figure 10:
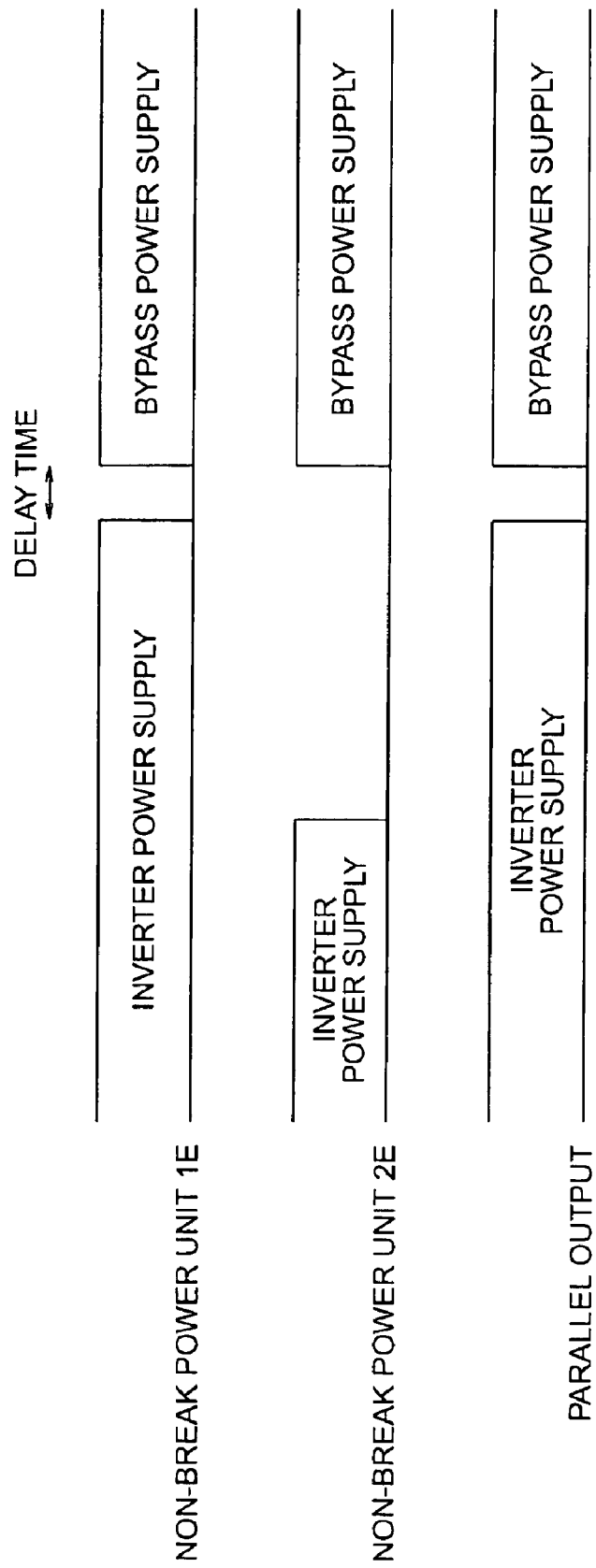
FIG. 10 is a timing chart for illustrating processing operations carried out in the system according to the sixth embodiment of the invention.

FIG. 9 is a circuit block diagram showing the non-break power unit parallel operating system according to the sixth embodiment of the invention, and FIG. 10 is a timing chart for illustrating a processing operation carried out in the system according to the instant embodiment of the invention.

In FIG. 9, components similar to those described previously (see FIG. 2) are denoted by like reference symbols affixed with or without "E", and detailed description thereof will be omitted.

The system now under consideration differs from the one shown in FIG. 2 in that asynchronism detecting circuits 1021 and 2021, AND circuits 1022 and 2022, delay circuits 1023 and 2023 and OR circuits 1024 and 2024 are additionally provided in the non-break power units, respectively.

In other words, the system shown in FIG. 9 differs from the systems described hereinbefore in that a synchronous state signal indicating the synchronism between the inverter output and the bypass power source is made use of for driving the AC switch.

Now, referring to FIG. 9, when the asynchronous state is detected between the output voltage of the inverter 15 and the bypass power source, the asynchronism detecting circuit 1021 generates an output signal of level "HIGH", which is then inputted to the AND circuit 1022. Similarly, the asynchronism detecting circuit 2021 generates the output signal of level "HIGH" to be inputted to the AND circuit 2022.

The inverted signal of the inverter power supply interruption signal (the inverted signal thus representing the inverter power supply signal) is delayed by the delay circuit 1023 to be subsequently inputted to the AND circuit 1022. Similarly, the inverted signal of the inverter power supply interruption signal (this inverted signal thus representing the inverter power supply signal) is delayed by the delay circuit 2023 to be subsequently inputted to the AND circuit 2022.

The AND circuit 1022 determines the logical product of the output signal of the asynchronism detecting circuit 1021 and that of the delay circuit 1023, the logical product signal being then inputted to the OR circuit 1024, whereas the AND circuit 2022 determines the logical product of the output signal of the asynchronism detecting circuit 2021 and that of the delay circuit 2023, wherein the logical product signal is inputted to the OR circuit 2024.

On the other hand, the OR circuit 1024 determines the logical sum of the output signal of the AND circuit 1022 and the inverted signal (inverter power supply signal) resulting from inversion of the inverter power supply interruption signal, whereon the logical sum signal is applied to the base electrode of the switching element 1003. Similarly, the OR circuit 2024 determines the logical sum of the output signal of the AND circuit 2022 and the inverted signal (i.e., the inverter power supply signal) resulting from inversion) of the inverter power supply interruption signal, whereon the logical sum as determined is inputted to the base of the switching element 2003.

Next, referring to FIG. 10 together with FIG. 1, description will turn to operation of the non-break power unit parallel operating system according to the instant embodiment of the present invention shown in FIG. 9.

The non-break power unit parallel operating system according to the instant embodiment of the invention is so designed as to operate in parallel the non-break power units 1E and 2E in the inverter power supply state mode at timing illustrated in FIG. 10.

At this juncture, let's assume that in the non-break power units 1E and 2E operating in parallel in the inverter power supply state mode, operation of the inverter 25 incorporated in the non-break power unit 2E (see FIG. 1) is stopped at first, as is illustrated in FIG. 10.

In that case, since the inverter 15 incorporated in the non-break power unit 1E is operating yet, the inverter power supply state mode continues, whereby the parallel operation output is sustained in the inverter power supply state.

Again, let's assume that the inverter 15 incorporated in the non-break power unit 1E stops its operation. In that case, if the output voltage of the bypass power source and that of the inverter 15 incorporated in the non-break power unit 1E are in the asynchronous state, then the voltages of different phases are supplied to the load, incurring inconvenience.

For disposing of the inconvenience described above, it is ordinarily required to provide a non-voltage period. However, with the ordinary circuit configuration, the AC switches 17 and 27 are turned on simultaneously with the stoppage of the inverter power supply, and thus it is impossible to make available the non-voltage period.

In this conjunction, paying attention to the non-break power unit 1E in the circuit configuration shown in FIG. 9, the signal derived by delaying the inverter power supply signal is outputted from the AND circuit 1022 only when the output signal of the inverting circuit 1005 (i.e., the inverter power supply signal) is delayed by the delay circuit 1023 and when the asynchronism detecting circuit 1021 outputs the asynchronism signal.

In succession, the output signal of the AND circuit 1022 is logically ORed with the inverter power supply signal through the OR circuit 1024 to thereby drive the switching element 1003.

As is apparent from the above, with the circuit configuration shown in FIG. 9, the turn-on timings of the AC switches 17 and 27 are delayed for time durations brought about by the delay circuits 1023 and 2023, respectively, when both the concerned non-break power unit and the other non-break power unit are in the asynchronous state, as a result of which the bypass power supply is effectuated at the timing illustrated in FIG. 10.

Thus, by connecting in parallel the inverter power supply signal output terminals of the individual non-break power units to thereby generate the driving signals for the AC switches 17 and 27, not only the non-break power units can be operated in parallel with a small number of inter-unit wiring conductors but also it is possible to prevent the voltages of different phases from being supplied to the load by providing or securing the non-voltage period determined by the delay time when the output voltage of the inverter and that of the bypass power source are in the asynchronous state.

Embodiment 7

In the non-break power unit parallel operating system according to the sixth embodiment of the invention, the non-voltage period is validated in the state asynchronous with the bypass power source in the case when the inverter power supplies of the individual non-break power units are sequentially stopped. A seventh embodiment of the present invention is directed to the non-break power unit parallel operating system in which such arrangement is adopted that the non-voltage period is validated or secured when the inverter power supply interruption occurs simultaneously in all the non-break power units.

In the following, referring to FIG. 11 in combination with FIG. 1, description will be made of the non-break power unit parallel operating system according to the seventh embodiment of the invention which is so arranged that when the inverter power supply interruption takes place simultaneously in all the non-break power units, the non-voltage period is ensured.

Figure 11:
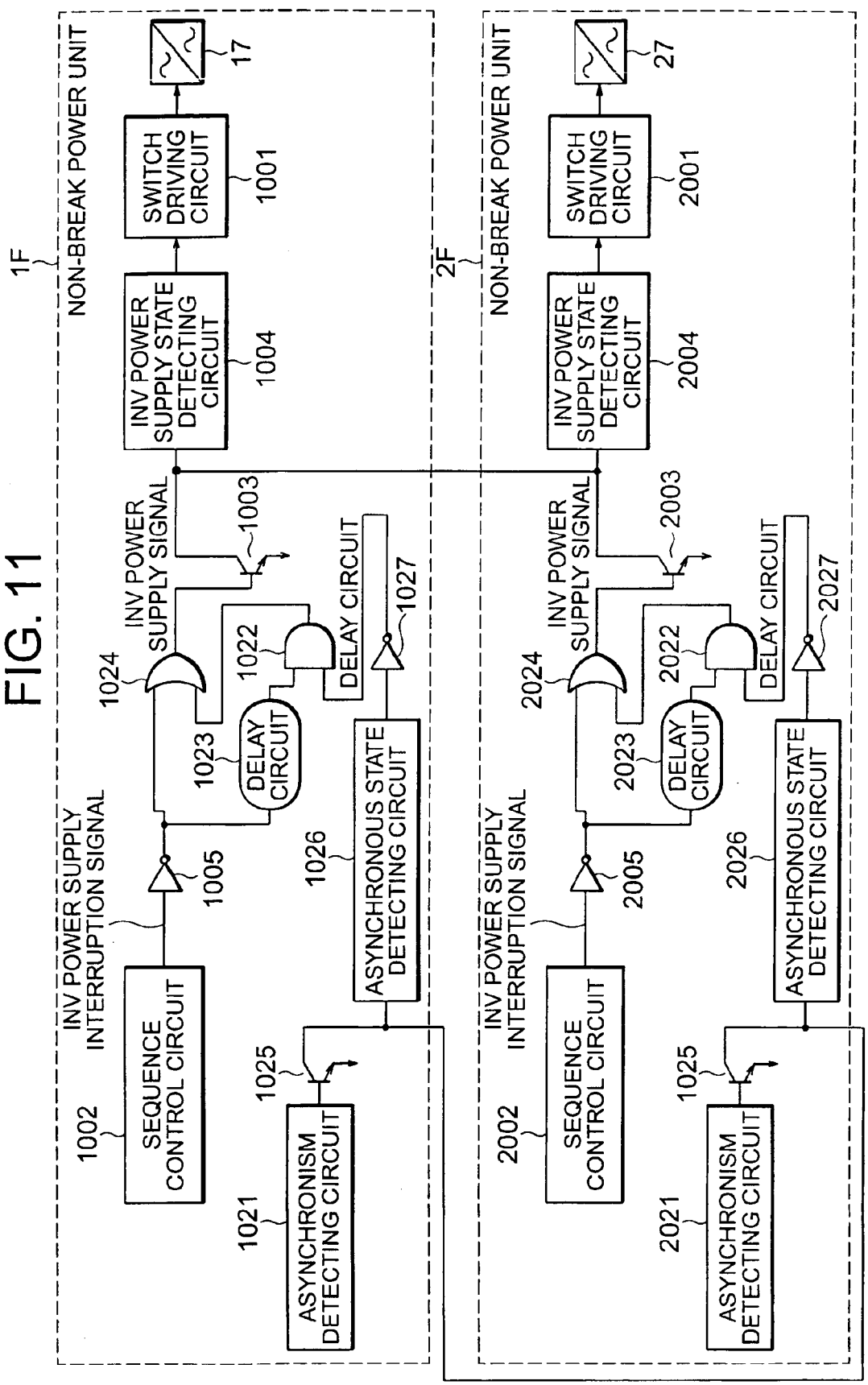
FIG. 11 is a functional block diagram showing a circuit arrangement of the non-break power units according to a seventh embodiment of the present invention.

FIG. 11 is a circuit block diagram of the non-break power unit parallel operating system according to the seventh embodiment of the present invention. In this figure, components similar to those described previously (see FIG. 9) are denoted by like reference symbols affixed with or without "F", and detailed description thereof will be omitted.

The system shown in FIG. 11 differs from the one shown in FIG. 9 in that switching elements 1025 and 2025, asynchronous state detecting circuits 1026 and 2026 and inverting circuits 1027 and 2027 are additionally provided.

The switching elements 1025 and 2025 are constituted by transistors whose bases are connected to the output terminals of the asynchronism detecting circuits 1021 and 2021, respectively, wherein the collectors (output terminals) of these transistors are connected to the input terminals of the asynchronous state detecting circuits 1026 and 2026, respectively.

The collectors of the switching elements 1025 and 2025 are interconnected. The output terminals of the asynchronous state detecting circuits 1026 and 2026 are connected to the input terminals of the AND circuits 1022 and 2022 via the inverting circuits 1027 and 2027, respectively.

The non-break power unit parallel operating system according to the seventh embodiment of the invention is so designed as to operate the non-break power units 1F and 2F by recognizing that all the non-break power units 1F and 2F are in the asynchronous state when asynchronous state is detected in any one of the non-break power units 1F and 2F.

As can be seen in FIG. 11, in one of the non-break power units i.e., non-break power unit 1F, the switching element 1025 is driven by the output signal of the asynchronism detecting circuit 1021.

Further, the collector (output terminal) of the switching element 1025 is connected in parallel to the output terminal of the switching element 2025 of the other non-break power unit 2F, wherein the output signal coupled in parallel is inputted to the asynchronous state detecting circuit 1026.

The asynchronous state detecting circuit 1026; 2026 is implemented in the circuit arrangement similar to the inverter power supply state detecting circuit 1004; 2004 described hereinbefore by reference to FIG. 3. Consequently, the output signal of level "LOW" is generated when either the non-break power unit 1F or 2F detects the asynchronous state.

Since the output signals of the asynchronous state detecting circuits 1026 and 2026 are inputted to the AND circuits 1022 and 2022 via the inverting circuits 1027 and 2027, respectively, the asynchronous state is recognized when any one of the non-break power units 1F and 2F assumes the asynchronous state.

Thus, when the non-break power units 1F and 2F assume simultaneously the inverter power supply interruption state, the non-voltage period can be set up in the asynchronous state.

As can be understood from the above, by connecting mutually in parallel the inverter power supply signal output terminals of the individual non-break power units to thereby generate the driving signals for the AC switches 17 and 27, not only the non-break power units 1F and 2F can be operated in parallel with a few inter-unit wiring conductors but also the non-voltage period corresponding to the delay time brought about by the delay circuit 1023, 2023 can be validated upon detection of the asynchronous state in either one of the non-break power units.

Embodiment 8

In the case of the non-break power unit parallel operating system according to the seventh embodiment of the invention (FIG. 11), the state asynchronous with the bypass power source is detected by making use of the asynchronism detecting circuits 1021 and 2021 and the asynchronous state detecting circuits 1026 and 2026. An eighth embodiment of the invention concerns the non-break power unit parallel operating system in which the state synchronous with the bypass power source is detected by making use of synchronism detecting circuits 1031 and 2031 and synchronous state detecting circuits 1036 and 2036.

In the following, referring to FIG. 12 together with FIG. 1, description will be made of the non-break power unit parallel operating system according to an eighth embodiment of the present invention which is so arranged that when the inverter power supply interruption takes place simultaneously in all the non-break power units, the non-voltage period is invalidated or ensured.

FIG. 12 is a circuit block diagram of the non-break power unit parallel operating system according to the eighth embodiment of the invention. In this figure, components similar to those described previously (see FIGS. 9 and 11) are denoted by like reference symbols affixed with or without "G", and detailed description thereof will be omitted.

Description will now be made of the processing for securing or validating the non-voltage period in the asynchronous state when the inverter power supply interruption takes place. simultaneously in the individual non-break power units 1G and 2G.

The non-break power unit parallel operating system shown in FIG. 12 differs from the one according to the seventh embodiment (FIG. 11) in the respects that the synchronism detecting circuits 1031 and 2031 are provided, respectively, in place of the asynchronism detecting circuits 1021 and 2021 shown in FIG. 11, and the synchronous state detecting circuits 1036 and 2036 are provided, respectively, in place of the asynchronous state detecting circuits 1026 and 2026. Further, the inverting circuits 1027 and 2027 described previously by reference to FIG. 11 are spared.

The synchronism detecting circuit 1031; 2031 is so designed as to detect the synchronous state between the output voltage of the inverter 15; 25 and that of the bypass power source to thereby output the synchronous state signal of level "HIGH".

The non-break power unit parallel operating system according to the eighth embodiment of the invention is so designed as to operate by recognizing that all the non-break power units 1G and 2G are in the asynchronous state only when it is detected that all the non-break power unit 1G and 2G are in the asynchronous state.

As can be seen in FIG. 12, in the non-break power unit 1G, the switching element 1025 is driven by the output signal of the synchronism detecting circuit 1031.

The output terminal of the switching element 1025 is connected in parallel to the output terminal of the switching element 2025 of the non-break power unit 2G, wherein the output signal coupled in parallel is inputted to the synchronous state detecting circuit 1036.

The synchronous state detecting circuit 1036; 2036 is implemented in the circuit arrangement similar to the inverter power supply state detecting circuit 1004; 2004 described hereinbefore by reference to FIG. 3. Consequently, the output signal of level "HIGH" is generated when all the non-break power units 1G and 2G detect the asynchronous state, while the output signal of level "LOW" is generated when either one of the non-break power units 1G or 2G detects the synchronous state.

The output signals of the synchronous state detecting circuits 1036 and 2036 are inputted to the AND circuits 1022 and 2022, respectively. Thus, the asynchronous state is recognized when all the non-break power units 1G and 2G are detected to be in the asynchronous state.

Thus, in the case where the individual non-break power units 1G and 2G assume simultaneously the inverter power supply interruption state, the non-voltage period can be secured in the asynchronous state when it is detected that all of the non-break power units 1G and 2G are detected to be in the asynchronous state.

As can be seen from the above, by connecting in parallel the inverter power supply signal output terminals of the individual non-break power units to thereby generate the driving signals for the AC switch 17; 27, not only the non-break power units 1G and 2G can be operated in parallel with a few inter-unit wiring conductors but also the non-voltage period corresponding to the delay time of the delay circuit 1023, 2023 can be ensured when the asynchronous state is detected in all the non-break power units 1G and 2G.

Many features and advantages of the present invention are apparent from the detailed description and thus it is intended by the appended claims to cover all such features and advantages of the system which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. A system for operating in parallel a plurality of non-break power units inserted separately between (i) a bypass power source and a plurality of input power sources and (ii) a parallel bus, each of said non-break power units comprising:
an inverter inserted between an input power source and the parallel bus; and
an AC switch inserted between the bypass power source and the parallel bus;

each of said non-break power units having:
an inverter power supply mode in which power is supplied from the input power source to the parallel bus by way of said inverter with said AC switch open; and
a bypass power supply mode in which, when operation of said inverter stops, said AC switch is closed to enable the AC power to be supplied directly to said parallel bus from said bypass power source by way of said AC switch, each of said non-break power units further comprising:
a sequence control circuit for generating an output signal corresponding to an inverter power supply signal;
a switching element for outputting the inverter power supply signal based on the output signal of said sequence control circuit; and
a switch driving circuit for generating a driving signal for said AC switch in response to the inverter power supply signal, wherein
output terminals of said switching elements incorporated in said plurality of non-break power units, respectively, are connected in parallel with one another, and
said switch driving circuit incorporated in each of said non-break power units generates the driving signal for the associated AC switch based on a composite signal generated by synthesizing the inverter power supply signals in said non-break power units.

2. The non-break power unit parallel operating system according to claim 1, wherein the output terminals of said switching elements incorporated in said non-break power units are connected in parallel with one another in a loop-like form.

3. The non-break power unit parallel operating system according to claim 1, wherein each of said non-break power units further comprises:
a switch inserted on an output side of said non-break power unit, and
an auxiliary contact of said switch inserted on an input terminal side of said switching element of said non-break power unit, and said switching element outputs the inverter power supply signal by additionally taking into account a state signal of said switch of said non-break power unit to which said switching element belongs, as a condition for enabling the inverter power supply signal to be output.

4. The non-break power unit parallel operating system according to claim 3, wherein said switch driving circuit of each of said non-break power units outputs a driving signal for said AC switch by additionally taking into account the state signal of said switch of said non-break power unit to which said switch driving circuit belongs, as a condition for enabling the driving signal to be output.

5. The non-break power unit parallel operating system according to claim 1, wherein
each of said non-break power units further comprises an inverter power supply state detecting circuit inserted between the output terminal of said switching element and said switch driving circuit, said inverter power supply state detecting circuit comprises:
  a photo-coupler connected to the output terminal of said switching element, and
  a diode connected in series to said photo-coupler, wherein the composite signal derived from synthesizing the inverter power supply signals is detected by said photo-coupler and said diode.

6. The non-break power unit parallel operating system according to claim 1, wherein
  each of said non-break power units further comprises a synchronous/asynchronous state detecting circuit for detecting synchronous/asynchronous state between the output voltage of said inverter and that of said bypass power source to output a synchronous state signal, and
  said switch driving circuit outputs a driving signal for said AC switch by additionally taking into account the synchronous state signal in said non-break power unit to which said switch driving circuit belongs, as condition for enabling the driving signal to be output.

7. The non-break power unit parallel operating system according to claim 6, wherein
  the synchronous state signal containing an asynchronism signal indicates an asynchronous state between the output voltage of said inverter and the voltage of said bypass power source, and
  an output terminal for the asynchronism signal is connected in parallel to the output terminal for the asynchronism signal of the other non-break power unit.

8. The non-break power unit parallel operating system according to claim 6, wherein
  the synchronous state signal contains a synchronism signal indicating a synchronous state between the output voltage of said inverter and the voltage of said bypass power source, and
  an output terminal for the synchronism signal is connected in parallel to the output terminal for the synchronism signal of the other non-break power unit.

9. The non-break power unit parallel operating system according to claim 6, wherein each of said non break power units further comprises:
  a delay circuit for delaying the output signal of said sequence control circuit for a predetermined time;
  an AND circuit for determining a logical product of the synchronous state signal and the output signal of said delay circuit; and
  an OR circuit for determining a logical sum of the output signal of said AND circuit and the output signal of said sequence control circuit, wherein a logical sum signal output from said OR circuit is input to said switching element.

* * * * *